United States Patent [19]

Okamoto et al.

[11] 4,369,710
[45] Jan. 25, 1983

[54] END-BURNING GAS-GENERATING COMPOSITION GRAIN CONTAINING INTERTWISTED WIRES

[75] Inventors: Hisao Okamoto, Sayama; Daizo Fukuma, Sakado, both of Japan

[73] Assignee: Nissan Motor Company, Ltd., Yokohama, Japan

[21] Appl. No.: 243,894

[22] Filed: Mar. 16, 1981

[30] Foreign Application Priority Data

Mar. 18, 1980 [JP] Japan .................... 55-35649

[51] Int. Cl.³ .............................................. F42B 1/00
[52] U.S. Cl. ................................................... 102/289
[58] Field of Search ............... 102/289, 287, 291, 530; 60/243

[56] References Cited

U.S. PATENT DOCUMENTS 3,116,692  1/1964  Rumbel et al. .
3,509,822  5/1970  Rice et al. ................ 102/289

Primary Examiner—Charles T. Jordan
Assistant Examiner—Teddi L. Parr
Attorney, Agent, or Firm—Schwartz, Jeffery, Schwaab, Mack, Blumenthal & Koch

[57] ABSTRACT

An end-burning grain of a solid gas-generating composition which may be a propellant for use in rocket motors, in which an elongate metal heat conductor is embedded to increase mass burning rate by the effect of heat transferred from the hot combustion gas to the unburned gas-generating composition through the heat conductor. The improvement resides in that the heat conductor is constituted of a plurality of relatively thin wires which are loosely twisted together. This heat conductor can produce greater extent of increase in the burning rate and has a mechanical strength sufficient for embedding in a practical grain.

8 Claims, 6 Drawing Figures

END-BURNING GAS-GENERATING COMPOSITION GRAIN CONTAINING INTERTWISTED WIRES

BACKGROUND OF THE INVENTION

This invention relates to an end-burning grain of a solid propellant or a solid gas-generating composition for any other purpose, in which grain is embedded a metal heat conductor in the form of wire with the intention of increasing mass burning rate of the grain by increasing the burning surface area.

In solid propellant rocket motors and pyrotechnic gas generators for various purposes, end-burning grains that burn in the cigarette fashion from one end are used where it is desired to continue stable generation of combustion gases for a relatively long period of time. For a given composition the duration of gas generation is approximately proportional to the grain length, and the rate of gas generation or mass burning rate is approximately proportional to the burning surface area given by the area of the exposed end surface at which the grain is ignited.

With regard to solid propellant rocket motors of the end-burning type by way of example, the length of the motors and hence the length of the propellant grains can be determined with enough freedom to maintain the thrust for a required period of time, but in most cases great restrictions are placed on enlargement of the motor diameter and hence the burning surface are of the propellant grains with a view to increasing the thrust, which depends fundamentally on the mass burning rate of the propellant grains. If a considerable increase in the thrust is wished without increasing the motor diameter correspondingly, the wish must be fulfilled by employing a propellant inherently high in burning rate or by modifying a conventional propellant composition so as to attain a sufficiently increased burning rate. However, there is a limit to the normal burning rate of available solid propellants, and much difficulties and restrictions are posed on practical modifications of conventional propellant compositions or development of a new propellant composition.

As a solution of the above described problem, U.S. Pat. No. 3,116,692 teaches that the effective burning surface area and hence the mass burning rate of a solid propellant end-burning grain can greatly be increased by embedding a metal heat conductor in the grain and recommends to use a continuous wire as the metal heat conductor. As the most suitable way of putting this method into practice, the wire is embedded in the propellant grain normal to the exposed end surface of the grain to axially extend in the direction of flame propagation over a sufficient distance from the end surface, conveniently over the full length of the grain. The favorable effect of the embedded wire on the burning rate of the grain originates in a considerably higher heat conductivity or thermal diffusivity of the wire than the propellant material. As the grain is ignited at the exposed end surface and the propellant burns in the cigarette fashion an end portion of the wire is strongly heated by the hot combustion gas, and there occurs rapid and continuous transfer of a considerable amount of heat through the wire from the flame zone to the unburned portion of the propellant. Then burning proceeds rapidly along the wire probably by reason of accelerated decomposition of the oxidant in the unburned propellant, so that the burning surface begins to dent forwardly in a region adjacent to the wire to give a conical surface with the wire at its apex. The denting continues until the cone encompasses the entire width of the grain and brings about a great increase in the burning surface area. Owing to the increased rate of burning along the wire and the increased burning surface area, the grain burns with a greatly increased rate of gas generation. If desired, a plurality of suitably spaced wires may be embedded parallel to each other in a single grain.

Experimental results show an interesting fact that the effect of the embedded wire on the burning rate depends significantly on the thickness of the wire and becomes maximal when the thickness or diameter of the wire is about 0.1 mm. This fact may be explained as follows. Considering that the increase of the burning rate attained by the presence of the wire is primarily attributed to a rise in the temperature of the unburned propellant adjacent to the wire and that the wire is surrounded by the mass of the low temperature propellant, the effect of the wire will become appreciable only when the heat capacity of the wire, which is determined by the wire thickness, is large enough to conduct a fair amount of heat from the flame zone to the unburned propellant. On the other hand, the degree of heating of the wire by the hot combustion gas will lower as the heat capacity of the wire becomes larger, so that the heat-conducting effect is gradually negated as the wire diameter increases beyond about 0.1 mm.

In practical applications of the above described technique according to U.S. Pat. No. 3,116,692, however, it is quite difficult and almost impossible to attain a maximal extent of increase in the burning rate by using a wire having an optimum diameter of about 0.1 mm because of breaking or significant bending of such a thin wire during embedding of the wire in a solid end-burning grain accomplished at the stage of casting the grain, for example, by using a relatively high viscosity slurry of the propellant materials. For rocket motors and other types of gas-generating devices, the experience has taught that the wire to be embedded longitudinally in an end-burning grain needs to be at least about 0.2 mm in diameter in order to resist mechanical stresses exerted thereon during the grain-forming and wire-embedding operations.

SUMMARY OF THE INVENTION

It is an object of the present invention to solve the above described problem in the burning-rate increasing method disclosed in U.S. Pat. No. 3,116,892 by devising an improved heat-conducting element which is sufficiently high in mechanical strength so that it can readily be embedded in an end-burning gas-generating composition grain of a practical size without being damaged or distorted and, nevertheless, is highly effective for increasing mass burning rate of the end-burning grain.

According to the invention, a heat-conducting element embedded in an end-burning grain of a solid gas-generating composition to transfer heat during combustion of the grain from the hot composition gas to the unburned portion of the gas-generating composition is constituted of at least two wires which are intertwisted loosely.

Since this heat-conducting element is an assembly of a plurality of physically united wires, a sufficiently high mechanical strength can be afforded to this element even when each of the intertwisted wires is very small in diameter by adequately determining the number of the wires. Accordingly, embedding of this heat-conducting element in an end-burning grain of a practical size can be accomplished during forming of the grain with little difficulty or problem.

Therefore, it becomes practicable to use a wire having an optimum diameter such as about 0.1 mm as the material of this heat-conducting element. Because of looseness of the twisting of the wires in the heat-conducting element, the intertwisted wires are readily disentangled to become independent when exposed to a vigorous flow of the hot combustion gas. Accordingly the heat-conducting element can be heated at a very high rate corresponding to a small heat capacity of each individual wire. In the unburned portion of the grain, however, the wires of this heat-conducting element remain in the intertwisted and closely located state. Accordingly the efficiency of supply of heat from this element to the unburned gas-generating composition depends on the total heat capacity of the assembled wires and therefore becomes sufficiently high even though the element consists of very thin wires. Mainly for these reasons, an end-burning grain according to the invention exhibits remarkable increase in the rate of burning and hence in the rate of gas generation.

Usually this heat-conducting element is disposed in the grain parallel to the longitudinal axis of the grain to extend from the exposed end surface of the grain over a sufficient distance, preferably throughout the full length of the grain.

DETAILED DESCRIPTION OF THE INVENTION

Figure 1:
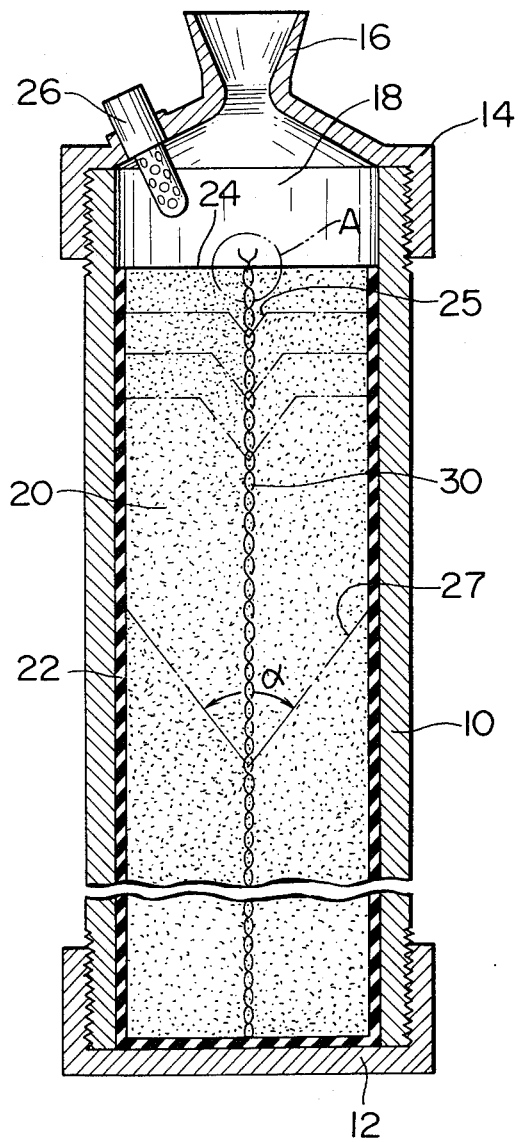
FIG. 1 is a longitudinal sectional view of a solid propellant rocket motor which utilizes an end-burning grain containing a heat-conducting element according to the invention.

FIG. 1 shows a solid propellant rocket motor of the end-burning type as an example of practical applications of the present invention.

Indicated at 10 is a cylindrical motor case to which a forward closure plate 12 is screwed. A nozzle assembly consisting fundamentally of a closure ring 14 and a nozzle 16 is screwed to the rear end of the motor case 10. A cylindrical grain 20 of a conventional solid propellant, which may be either a composite propellant or a double-base propellant, is loaded in the motor case 10 to occupy a major volume of a combustion chamber 18 defined in the motor case 10. The cylindrical side surface and the forward end surface of the grain 20 are completely covered with inhibitors 22 the material of which is a heat-resistant synthetic resin or rubber, and the inhibited grain 20 is bonded to the motor case 10 by using an adhesive in the usual manner. The rear end surface 24 of the propellant grain 20 is left exposed as the initial ignition surface, and an ignitor 26 is attached to the nozzle assembly.

An elongate heat-conducting element 30 is embedded in the propellant grain 20 so as to extend normal to the end burning surface 24 and accordingly parallel to the longitudinal axis of the grain 20. More in detail, the heat-conducting element 30 is an assembly of a plurality of metal wires which are loosely twisted together as mentioned hereinbefore. As can be best seen in the enlarged view of FIG. 2, herein illustrated is the simplest case where only two wires or metal filaments 32 are twisted together to constitute the heat-conducting element 30. This is chiefly for the sake of convenience of elucidation and therefore should not be taken as showing particular preferableness of using only two wires. These wires 32 are intertwisted so loosely that the wires 32 are spaced from each other over large fractions of their entire lengths. The embedding of the heat-conducting element 30 is accomplished at the stage of forming the propellant grain 20. For example, in the case of a composite propellant, the intertwisted wires 32 are disposed and held longitudinally in a cylindrical mold into which a slurry of the materials of the propellant is poured in vacuum, followed by a heat-curing process. Accordingly the spaces between the loosely intertwisted wires 32 are completely filled with fractions 20a of the propellant. As will be understood, these fractions 20a of the propellant must be continuous with the major mass of the propellant grain 20, but this requirement can be met with little difficulty when the wires 32 are intertwisted sufficiently loosely and unless an excessively large number of wires are used to constitute one heat-conducting element.

In practice, it is convenient to extend the heat-conducting element 30 over the full length of the propellant grain 20, and the rear end of this element 30 may protrude for a short distance from the exposed end surface 24 of the grain 20. In FIG. 1, one unit of heat-conducting element 30 is disposed along the central axis of the grain 20, but this is not limitative. If desired, two or more units of heat conducting elements each consisting of a plurality of intertwisted wires may be embedded in the single grain with suitable intervals between the respective units.

There is no particular restriction on the material of the wires 32, but it is preferable to use silver, gold or platinum in consideration of not only thermal properties but also chemical stableness.

To facilitate understanding of advantages of the heat-conducting element 30 according to the invention, a supplemental explanation of a propellant grain according to U.S. Pat. No. 3,116,692 will be made with reference to FIG. 3.

Figure 3:
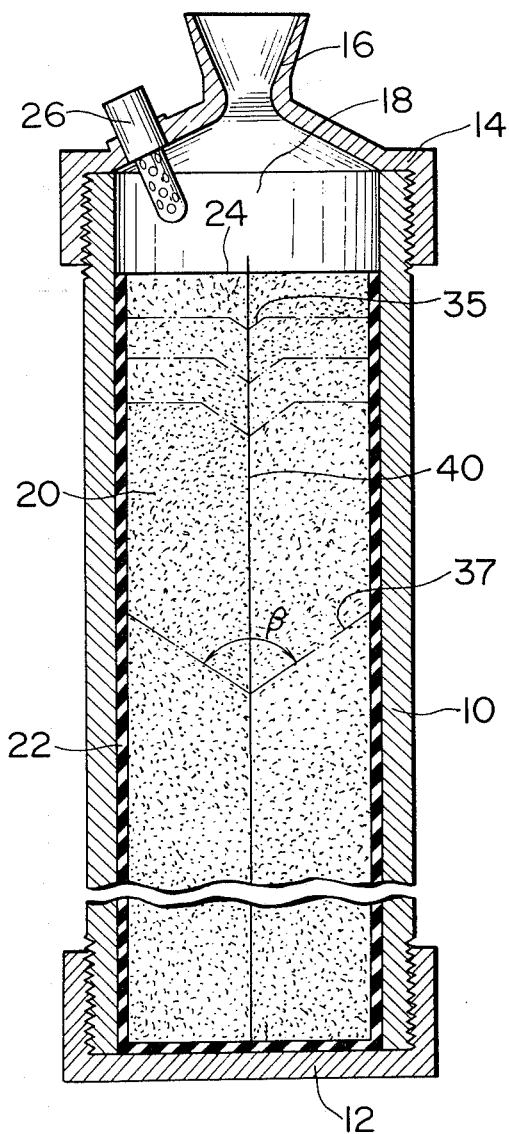
FIG. 3 is a longitudinal sectional view of a solid propellant rocket motor which utilizes an end-burning grain containing a heat-conducting element which is similar in principle to that shown in FIGS. 1 and 2 but is not in accordance with the present invention.

The solid propellant rocket motor of FIG. 3 is almost identical with that of FIG. 1. As a sole difference, embedded as a heat conductor in end-burning grain 20' of FIG. 3 is a single wire 40. The manner of disposition of this wire 40 in the grain 20' is similar to that of the double-wire heat-conducting element 30 in the grain 20 of FIG. 1.

After ignition of the propellant grain 20' at the exposed end surface 24, combustion of the propellant proceeds with steady advance of a substantially flat and circular burning surface parallel to the initial ignition surface 24. However, soon the wire 40 begins to work as a heat conductor to accelerate decomposition of the oxidant, such as ammonium perchlorate in the case of a composite propellant, in the unburned propellant around the wire 40, whereby the combustion is accelerated in a central region of the grain 20' around the wire 40 as described hereinbefore. Therefore, a central region of the advancing burning surface dents forwardly to give a conical surface as indicated at 35 with the wire 40 at its apex. As the burning surface advances as illustrated by phantom lines, the conical surface continues to grow larger until the base periphery of the cone reaches the cylindrical periphery of the grain 20'. At this stage, the entire area of the burning surface becomes a conical surface 37. The area of this conical surface 37 is of course considerably larger than the area of the initial burning surface 24, and the degree of increase in the burning surface area is given by the angle of vertex $\beta$ of the conical surface 37. Thereafter the combustion proceeds with maintenance of the maximally enlarged shape of the conical burning surface, so that the rate of gas generation is considerably increased compared with the case of the burning surface remaining flat and parallel to the initial ignition surface.

The measure of the angle $\beta$ of the conical burning surface 37 depends principally on the material (i.e. heat conductivity) of the wire 40, thickness (i.e. heat capacity) of the wire 40 and the composition of the solid propellant and becomes smaller as the amount of heat supplied to the unburned propellant through the wire 40 increases. In other words, the degree of increase in the burning rate or gas evolution rate by the effect of the embedded wire 40 becomes larger as the angle $\beta$ becomes smaller and, when both the solid propellant composition and the wire material are determined, depends primarily on the thickness of the wire 40.

Figure 4:
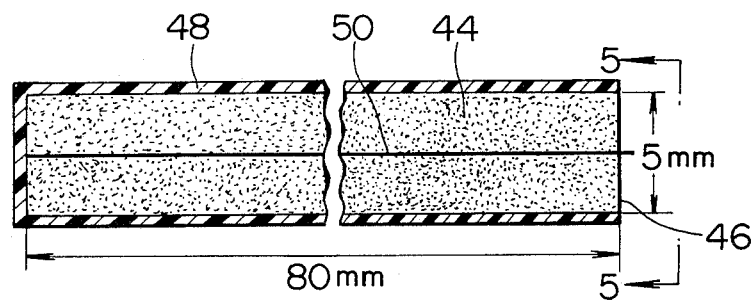
FIG. 4 is a longitudinal sectional view of a test piece of a solid propellant, with a heat-conducting element embedded therein, for measurement of burning rate in a strand burner.
Figure 5:
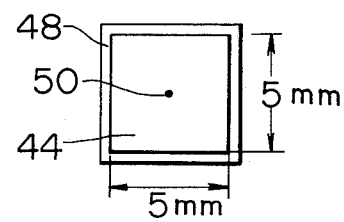
FIG. 5 is a front end view of the test piece of FIG. 4.
Figure 6:
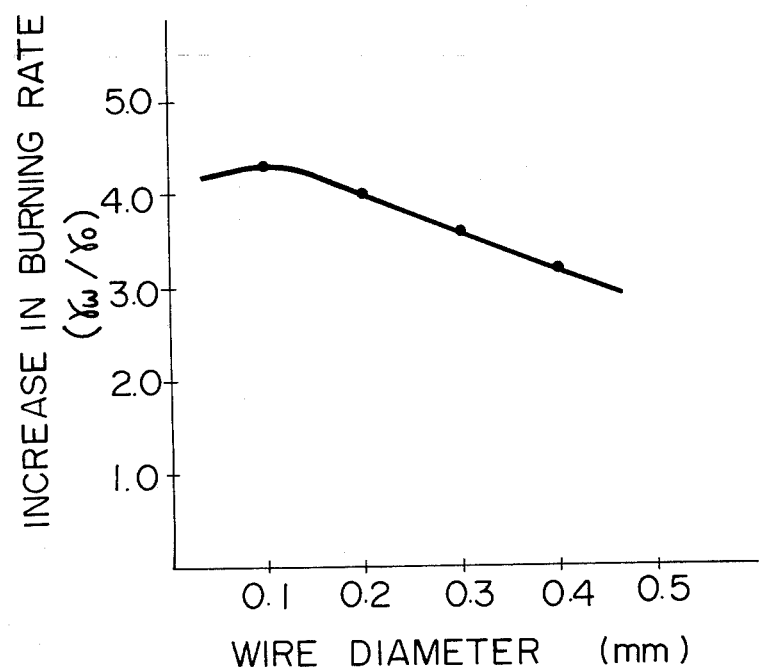
FIG. 6 is a graph showing an experimentally confirmed relationship between the diameter of a wire embedded in an end-burning propellant grain and the degree of increase in the burning rate of the grain by the effect of the embedded wire.

An experiment was carried out with respect to a combination of a polybutadiene-based composite propellant and silver wire. In this experiment the burning rate of a propellant grain containing a single wire of silver was measured by using a test piece as shown in FIGS. 4 and 5. A silver wire 50 of a selected diameter was embedded in a grain 44 of the composite propellant, and the grain 44 was machined into the shape of a cross-sectionally square rod which was 5×5 mm in width and 80 mm in length. The side surfaces and one end surface of this rod were coated with inhibitor 48, and the thus prepared test piece was burned from the exposed end surface 46 in nitrogen gas atmosphere at 50 kg/cm² in a strand burner of the chimney type. The normal burning rate $\gamma_0$ of this composite propellant measured by the same method without embedding the wire 50 in the test piece was 18.2 mm/sec. The diameter of the silver wire 50 was varied in the range from 0.05 mm to 0.4 mm. The result of this experiment is shown in FIG. 6 as the relationship between the wire diameter and the degree of increase in the burning rate expressed by the ratio $\gamma\omega/\gamma_o$, where $\gamma\omega$ represents burning rate of the test piece containing the wire 50. This ratio took the highest value of about 4.3 when the wire diameter was about 0.1 mm and gradually lowered as the wire diameter increased, presumably by the reason explained hereinbefore.

In spite of the experimentally confirmed fact that a maximal degree of increase in the burning rate can be attained by using a wire as thin as about 0.1 mm, it is almost impossible to embed a single wire of such a small diameter in an end-burning grain of a practical size because of breaking or significant bending of the wire during the embedding operation as mentioned hereinbefore. Therefore, the wire 40 in the grain 20' of FIG. 3 should be considered as to have a diameter of about 0.2 mm or larger.

Referring again to FIGS. 1 and 2, an advantage of the heat-conducting element 30 according to the invention resides in that the element 30 can be embedded in the grain 20 of a practical size without breaking or significantly bending even when each of the intertwisted wires 32 is as small as about 0.1 mm in diameter because the tensile strength of the element 30 as a whole is determined by the total of the cross-sectional areas of the individual wires 32 and hence becomes far higher than the strength of each wire 32.

The following Table 1 presents experimentally obtained tensile strength values of a few examples of the heat-conducting element according to the invention constituted of intertwisted silver wires of 0.1 mm diameter, in comparison with the tensile strength values of simple silver wires ranging from 0.1 mm to 0.3 mm was produced by the steps of binding two, three or four wires of silver (each 0.1 mm in diameter and 50 l cm in length) at their one end portions, dividing the free end portions of the bound wires into two parts (e.g. into two wires and a single wire in the case of the bunch of three wires, but into two equal halves each consisting of two wires in the case of the bunch of four wires), parting sideways the divided parts so as to maintain a distance of 10 cm therebetween at the free ends of the wires and turning the divided and parted end portions at a rate of 1 to 2 turns per minute. The turning was terminated while the wires were only loosely intertwisted. For example, in the case of twisting two wires together the number of twisting or intersections of the two wires was about ten within a fractional length of 10 mm. In Table 1, the tensile strength of every sample is given by the measure (grams) of a load at which the sample broke.

TABLE 1

| Wire Diameter | Number of Wires | | | |
|---|---|---|---|---|
| | 1 | 2 | 3 | 4 |
| 0.1 mm | 156 g | 315 g | 562 g | 820 g |
| 0.2 mm | 814 g | — | — | — |
| 0.3 mm | 1375 g | — | — | — |

The experimental data in Table 1 show that, for example, when it is desired to use silver wire of 0.1 mm diameter as the material of a heat-conducting element according to the invention, the element becomes comparable in tensile strength to a single silver wire of 0.2 mm diameter and therefore can properly be embedded in a propellant grain by loosely intertwisting four wires of 0.1 mm diameter.

The effect of the heat-conducting element 30 in the grain 20 of FIG. 1 is principally similar to that of the single wire 40 in FIG. 3. After a short while from the moment of ignition of the grain 20 at the end surface 24, a central region of the advancing burning surface around the heat-conducting element 30 becomes a conical surface 25, which grows larger as the combustion proceeds until a maximally large conical surface 27 encompasses the full width of the grain 20. However, this heat-conducting element 30 can produce a greater extent of increase in the burning rate than the single wire 40 in FIG. 3 when the wires 32 of the element 30 are sufficiently small in diameter. The reasons are as follows.

Figure 2:
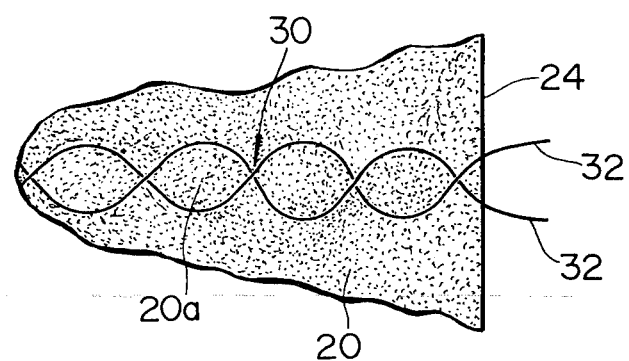
FIG. 2 is an enlargement of the encircled region A in FIG. 1.

Since the wires 32 are intertwisted only loosely as explanatorily illustrated in FIG. 2 and accordingly rather weak in the clinging strength, the wires 32 become disentangled and independent in their end portions exposed to the very hot and vigorously moving combustion gas. The disentangled wires 32 are individually heated very rapidly and efficiently because of the smallness of the heat capacity of each wire 32. On the other hand, in the unburned propellant the wires 32 are in the intertwisted state or, in other words, are located very close to each other. Therefore, it can be said that the efficiency of heat transfer from the heat-conducting element 30 to the mass of the unburned propellant is governed by the total heat capacity of the intertwisted wires 32 and accordingly is far higher than the efficiency of a single thin wire or a plurality of separately disposed thin wires. Moreover, the fractions 20a of the unburned propellant occupying the spaces between the loosely intertwisted wires 32 are particularly intensely heated to a temperature higher than a maximal temperature attained in the case of a single wire heat conductor as shown in FIG. 3. In this regard, it is unfavorable to intertwist an excessively large number of wires to constitute a heat-conducting element according to the invention. It is suitable to avoid the use of more than eight wires in one unit of heat-conducting element.

By the joint effects of the above described phenomena, the angle of vertex α of the conical burning surface 27 in the grain 20 of FIG. 1 can be made smaller than the angle β in FIG. 1 by using sufficiently thin wires 32 as the material of the heat-conducting element 30. For example, assume that each of the two wires 32 of the element 30 is 0.14 mm in diameter whereas the single wire 40 in FIG. 3 is 0.2 mm in diameter. Then the element 30 is approximately equal to the single wire 40 both in the total heat capacitance and in tensile strength, but the angle α in FIG. 1 becomes considerably smaller than the angle β in FIG. 3.

An experiment was carried out to examine variations of the burning-rate increasing effect of a heat-conducting element according to the invention with the number and diameter of wires used to constitute the heat-conducting element, using the aforementioned polybutadiene-based composite propellant and silver wires of various diameters. Measurement of the burning rate was made in nitrogen gas atmosphere at 50 kg/cm² in a strand burner of the chimney type by using test pieces as shown in FIGS. 4 and 5 and described hereinbefore in connection with the experimental result shown in FIG. 6. In the test pieces for testing a heat-conducting element according to the invention, the single wire 50 in FIGS. 4 and 5 was replaced by an assembly of a plurality of loosely intertwisted silver wires. The twisting of the wires was performed by the method described hereinbefore in connection with the experimental result shown in Table 1.

The result of this experiment is shown in the following Table 2. Each burning rate value in Table 2 is an average of experimental data obtained for five samples. By separate experiments, it was confirmed that a burning rate observed in this strand test method approximately corresponds to the burning rate of the same propellant in a central region around the intertwisted wires in a larger grain. For strand test pieces containing neither intertwisted wires nor a single wire, the average of the observed burning rate values was 18.2 mm/sec.

TABLE 2

| | (Burning Rate, mm/sec) | | | |
|---|---|---|---|---|
| | Wire Diameter | | | |
| Number of Wires | 0.1 mm | 0.2 mm | 0.3 mm | 0.4 mm |
| 1 | 78.7 | 72.8 | 67.3 | 60.1 |
| 2 | — | 78.9 | 71.0 | 61.3 |
| 3 | — | 74.1 | 66.4 | 57.4 |
| 4 | 80.1 | 71.4 | — | — |
| 5 | 79.1 | — | — | — |
| 6 | 72.2 | — | — | — |

The burning rate values in Table 2 demonstrate the above explained advantages of using an assembly of a plurality of loosely intertwisted wires of relatively small diameter as a heat-conducting element to be embedded in an end-burning grain. For example, when four or five wires of 0.1 mm diameter are twisted together to become comparable to a single wire of 0.2 mm diameter both in tensile strength and heat capacity, the extent of attainable increase in the burning rate becomes far higher than in the case of using a single wire of 0.2 mm diameter and comparable to, or even higher than in the case of using a single wire of 0.1 mm diameter.

It will be understood that the number and/or diameter of the wires to constitute a heat-conducting element according to the invention can variously be chosen according to, for example, the design and required performance of the gas-generating composition grain.

In the herein described experiments, every heat-conducting element according to the invention was constituted of a plurality of wires having the same diameter, but alternatively it is possible to produce a similarly effective heat-conducting element by twisting wires of different diameters together.

We claim:

1. In an end-burning grain of a solid gas-generating composition containing embedded therein an elongate metal heat-conducting element to increase mass burning rate of the grain by the effect of heat transferred during combustion of the grain from the hot combustion gas to the unburned portion of the grain through the heat-conducting element, the improvement comprising said heat-conducting element being constituted of at least two wires which are loosely twisted together.

2. An end-burning grain according to claim 1, wherein said wires are so loosely twisted together that said wires are spaced from each other over major fractions of the entire lengths thereof, the spaces between the respective wires being substantially completely filled with said gas-generating composition.

3. An end-burning grain according to claim 1 or 2, wherein said heat-conducting element is disposed so as to extend substantially parallel to the longitudinal axis of the grain from the exposed end surface of the grain.

4. An end-burning grain according to claim 3, wherein said heat-conducting element extends substantially over the entire length of the grain.

5. An end-burning grain according to claim 1, wherein the material of said wires is selected from the group consisting of silver, gold and platinum.

6. An end-burning grain according to claim 1, wherein each of said wires is smaller than 0.2 mm in diameter.

7. An end-burning grain according to claim 1, wherein the number of said wires is not larger than eight.

8. An end-burning grain according to claim 1, wherein said gas-generating composition is a composite propellant.

* * * * *